United States Patent [19]

Hamada

[11] Patent Number: 5,409,969

[45] Date of Patent: Apr. 25, 1995

[54] PNEUMATIC TIRES

[75] Inventor: Tatsuro Hamada, Kodaira, Japan

[73] Assignee: Bridgestone Corporation, Tokyo, Japan

[21] Appl. No.: 100,339

[22] Filed: Aug. 2, 1993

Related U.S. Application Data

[63] Continuation of Ser. No. 660,812, Feb. 26, 1991, abandoned.

[30] Foreign Application Priority Data

Mar. 2, 1990 [JP] Japan .................................. 2-49624
Mar. 2, 1990 [JP] Japan .................................. 2-49625

[51] Int. Cl.$^6$ .............................................. C08K 3/04
[52] U.S. Cl. .................................... 523/213; 524/495; 524/496
[58] Field of Search ................ 523/213; 524/493, 495, 524/496

[56] References Cited

U.S. PATENT DOCUMENTS

| | | | |
|---|---|---|---|
| 3,664,403 | 5/1972 | Doran et al. | 524/575.5 |
| 3,768,537 | 10/1973 | Hess et al. | 524/571 |
| 3,873,489 | 3/1975 | Thurn et al. | 524/552 |
| 3,881,536 | 5/1975 | Doran, Jr. et al. | 524/575.5 |
| 4,143,027 | 3/1979 | Sollman et al. | 524/571 |
| 4,431,755 | 2/1984 | Weber et al. | 524/575 |
| 4,436,847 | 3/1984 | Wagner | 524/575 |
| 4,519,430 | 5/1985 | Ahmad et al. | 524/571 |
| 4,820,751 | 4/1989 | Takeshita et al. | 524/495 |

FOREIGN PATENT DOCUMENTS

| | | |
|---|---|---|
| 0102045 | 3/1984 | European Pat. Off. . |
| 0298074 | 1/1989 | European Pat. Off. . |
| 0299074 | 1/1989 | European Pat. Off. . |
| 2056460 | 3/1981 | Germany . |
| 3813678 | 11/1988 | Germany . |

OTHER PUBLICATIONS

European Search Report and Annex.

*Primary Examiner*—Paul R. Michl
*Assistant Examiner*—Edward Cain
*Attorney, Agent, or Firm*—Sughrue, Mion, Zinn, Macpeak & Seas

[57] ABSTRACT

As a tread rubber of a pneumatic tire is used a rubber composition comprising 10–150 parts by weight of a silica filler, 0–150 parts by weight of carbon black and 0.2–10 parts by weight of at least one specified silane coupling agent, based on 100 parts by weight of a particular polymer rubber having a glass transition temperature of not lower than −50° C. through polymerization of 1,3-butadiene or copolymerization of 1,3-butadiene and styrene with an organic alkali metal initiator, or a rubber blend of not less than 30 parts by weight of the above polymer and not more than 70 parts by weight of the other diene series rubber.

5 Claims, No Drawings

PNEUMATIC TIRES

This is a Continuation of application Ser. No. 07/660,812, filed Feb. 26, 1991, now abandoned.

BACKGROUND OF THE INVENTION

1. Field of the Invention

This invention relates to pneumatic tires, and more particularly to a pneumatic tire simultaneously satisfying good wet-skid resistance, rolling resistance and wear resistance.

2. Related Art Statement

Recently, the study for reducing the rolling resistance of the tire has become important for saving the fuel consumption in automobiles in accordance with social demand for saving energy and resources. In general, it is known that as the rolling resistance of the tire is reduced, the fuel consumption in the automobile is mitigated to provide a low fuel consumption tire. In order to reduce the rolling resistance of the tire, generally a material having a small hysteresis loss as a tread rubber for the tire can be used. On the other hand, the use of a rubber material having a large friction resistance (wet-skid resistance) on wet road surface is strongly desired from the viewpoint of the demand for the running stability. However, the low rolling resistance and the high friction resistance on wet road surface are conflicting with each other, so that it is very difficult to simultaneously satisfy these properties.

Notably, the viscoelastic properties in the rubber composition are theoretically related to the wet-skid resistance and rolling resistance of the tire. That is, it is indicated to effectively reduce the fuel consumption by decreasing the hysteresis loss of the tread rubber for reducing the rolling resistance during the running of the tire, i.e. by viscoelastically decreasing the loss factor (tan $\delta$) at a temperature of 50°–70° C. used in the running of the tire. On the other hand, it is known that the wet-skid resistance is well interrelated to the loss factor (tan $\delta$) at about 0° C. at a frequency of 10–20 Hz. Therefore, it is required to make the loss factor at about 0° C. large in order to improve the gripping performance of the tire.

As a method of decreasing the hysteresis loss, generally a material having a low glass transition temperature can be used such as high-cis polybutadiene rubber and the like, or a material having a high rebound resilience such as natural rubber and the like. However, the use of these rubbers lowers the wet-skid resistance, so that it is considerably difficult to simultaneously establish the running stability and the low rolling resistance.

However, many techniques utilizing anion polymerization have been proposed in order to solve the aforementioned problems. For example, Japanese Patent laid open No. 55-12133 and No. 56-127650 disclose that high vinyl content polybutadiene rubber is effective for solving the problems, and Japanese Patent laid open No. 57-55204 and No. 57-73030 disclose that high vinyl content styrene-butadiene copolymer rubber is effective for solving the problems. Furthermore, Japanese Patent laid open No. 59-117514, No. 61-103902, No. 61-14214 and No. 61-141741 disclose that the heat generation is reduced by using a modified polymer obtained by introducing a functional group such as benzophenone, isocyanate or the like into a molecular chain of the polymer. Even in these techniques, the low value recently required for the rolling resistance is not yet sufficient.

SUMMARY OF THE INVENTION

It is, therefore, an object of the invention to overcome the aforementioned problems of the conventional techniques and to provide a pneumatic tire simultaneously satisfying good wet-skid resistance, rolling resistance and wear resistance.

The inventors have made various studies in order to solve the above problems and found that the above properties of the tire are considerably improved by using as a tread a rubber composition obtained by compounding silica and a silane coupling agent with polybutadiene or styrene-butadiene copolymer rubber having a particular glass transition temperature (Tg) through polymerization with an organic alkali metal initiator, preferably polybutadiene or styrene-butadiene copolymer modified with a silane compound, and as a result the invention has been accomplished.

According to the invention, there is the provision of a pneumatic tire comprising a tread made from a rubber composition comprising 10–150 parts by weight of a silica filler, 0–150 parts by weight of carbon black and 0.2–10 parts by weight of at least one silane coupling agent represented by the following general formula:

$$Y_3-Si-C_nH_{2n}A \qquad (I)$$

[wherein Y is an alkyl group or alkoxyl group having a carbon number of 1–4 or a chlorine atom, provided that the three Ys are the same or different, n is an integer of 1–6, and A is $-S_mC_nH_{2n}Si-Y_3$ group, $-X$ group or SmZ group (wherein X is a nitroso group, a mercapto group, an amino group, an epoxy group, a vinyl group, an imido group or a chlorine atom, Z is

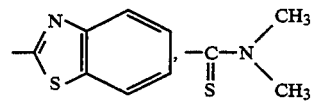

or

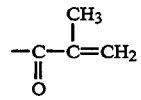

group, each of m and n is an integer of 1–6 and Y is the same as mentioned above)], based on 100 parts by weight of a polymer rubber having a glass transition temperature of not lower than $-50°$ C. through polymerization of 1,3-butadiene or copolymerization of 1,3-butadiene and styrene with an organic alkali metal initiator, or a rubber blend of not less than 30 parts by weight of the above polymer and not more than 70 parts by weight of the other diene series rubber.

In a preferable embodiment of the invention, the polymer is a silane-modified polymer having a glass transition temperature of not lower than $-50°$ C. and obtained by reacting an active terminal of a resulting living polymer through polymerization of 1,3-butadiene or copolymerization of 1,3-butadiene and styrene with an organic alkali metal initiator with a silane compound represented by the following general formula:

$$U_iSi(OR)_jR'_{4-i-j} \qquad (II)$$

(wherein U is a halogen atom selected from chlorine, bromine and iodine, each of R and R' is an alkyl group, an aryl group, a vinyl group or a halogenated alkyl group each having a carbon number of 1–20, j is an integer of 1–4, i is an integer of 0–2 and a sum of i and j is 2–4).

DESCRIPTION OF THE PREFERRED EMBODIMENTS

The polymer used in the invention can be produced by the well-known method using an organic alkali metal initiator. The production of such a polymer is usually carried out in an inert organic solvent. As the inert organic solvent, use may be made of pentane, hexane, cyclohexane, heptane, benzene, xylene, toluene, tetrahydrofuran, diethyl ether and the like.

At first, the polymerization of 1,3-butadiene or copolymerization of 1,3-butadiene and styrene is carried out in the presence of an organic alkali metal initiator. As the organic alkali metal initiator, mention may be made of alkyllithiums such as n-butyllithium, sec-butyllithium, t-butyllithium, 1,4-dilithium butane, reaction product of butyllithium and divinylbenzene and the like; alkylene dilithium, phenyl lithium, stilbene dilithium, diisopropenylbenzene dilithium, sodium naphthalene, lithium naphthalene etc.

In case of the copolymerization, a Lewis base may be used as a randomizing agent and a regulating agent for microstructure of butadiene unit in the copolymer, if necessary. As the Lewis base, mention may be made of ethers and tertiary amines such as dimethoxybenzene, tetrahydrofuran, dimethoxy ethane, diethylene glycol dibutyl ether, diethylene glycol dimethyl ether, triethylamine, pyridine, N-methyl morpholine, N,N,N',N'-tetramethyl ethylenediamine, 1,2-dipiperidinoethane and the like.

Moreover, the content of bound styrene in the copolymer can be controlled by varying the amount of styrene monomer in the monomer mixture, while the introduction of styrene single chain in the copolymer, i.e. arrangement of styrene chain without sequence of styrene chain unit can be controlled by the use of an organic potassium compound such as potassium dodecylbenzene sulfonate or the like. In addition, the content of 1,2-bond in butadiene unit of the copolymer molecule can be controlled by varying the polymerization temperature.

Furthermore, the living polymer may be produced by charging the monomers, i.e. 1,3-butadiene or 1,3-butadiene and styrene, the inert organic solvent, the organic alkali metal initiator and, if necessary, the Lewis base into a reaction vessel purged with nitrogen gas at once, discontinuously or continuously.

The polymerization temperature is usually $-120°$ C. to $+150°$ C., preferably $-88°$ C. to $+120°$ C., and the polymerization time is usually 5 minutes to 24 hours, preferably 10 minutes to 10 hours.

The polymerization temperature may be held at a constant value within the above range or may be raised or be adiabatic. And also, the polymerization reaction may be carried out by batch system or continuous system.

Moreover, the concentration of the monomer in the solvent is usually 5–50% by weight, preferably 10–35% by weight.

In the formation of the living polymer, it is necessary to prevent the incorporation of a compound exhibiting a deactivation function such as halogen compound, oxygen, water, carbon dioxide gas or the like into the polymerization system as far as possible in order to avoid the deactivation of the organic alkali metal initiator and the resulting living polymer.

The silane-modified polymer used in the invention is a modified rubber polymer having Si—O—R bond (R is the same as mentioned above) obtained by reacting the aforementioned silane compound with an active terminal of the resulting living polymer.

The silane compound to be reacted with the living polymer is a silane compound having at least one alkoxy group in one molecule and is represented by the general formula (II):

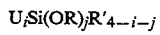  (II)

(wherein U, R, R', i and j are the same as mentioned above).

As the silane compound, there are preferable compounds in which OR group is non-hydrolytic, i.e. OR is a non-hydrolytic alkoxy group, aryloxy group or cycloalkoxy group having a carbon number of 4–20. Preferably, R in the OR group is a hydrocarbon residue in which three carbon atoms are bonded to carbon in α-position, a hydrocarbon residue in which a hydrocarbon group having a carbon number of not less than 1 is bonded to carbon in β-position, or an aromatic hydrocarbon residue such as a phenyl group or a toluyl group.

The term "non-hydrolysis" used herein means that when 60 g of a rubber sheet shaped through hot rolls of 120° C. at a roll gap of 0.5 mm is placed in a stainless steel vessel of 10 liters capacity together with 3 liters of warm water and left to stand while boiling the warm water by blowing steam and then dried, the rise of Mooney viscosity (ML1+4, 100° C.) of the polymer is substantially not more than 10 point, preferably not more than 5 point as compared with the non-treated polymer.

In R' of the formula (II), the alkyl group includes methyl group, ethyl group, n-propyl group, t-butyl group and the like, and the aryl group includes phenyl group, toluyl group, naphthyl group and the like, and the halogenated alkyl group includes chloromethyl group, bromomethyl group, iodomethyl group, chloroethyl group and the like.

For example, a compound of the formula (II) in which i is 0 and j is 2 is dialkyldialkoxy silane, and a compound in which i is 0 and j is 3 is monoalkyltrialkoxy silane, and a compound in which i is 0 and j is 4 is tetraalkoxy silane, and a compound in which i is 1 and j is 1 is monohalogenated dialkylmonoalkoxy silane, and a compound in which i is 1 and j is 2 is monohalogenated monoalkyldialkoxy silane, a compound in which i is 1 and j is 3 is monohalogenated trialkoxy silane, and a compound in which i is 2 and j is 1 is dihalogenated monoalkylmonoalkoxy silane, and a compound in which i is 2 and j is 2 dihalogenated dialkoxy silane. All of these compounds have a reactivity with the active terminal of the living polymer.

Particularly, monoalkyltriaryloxy silane where i=0 and j=3 and tetraaryloxy silane where i=0 and j=4 are preferable because polymers having an improved processability and a high compatibility with silica are obtained by coupling the living polymer with such a compound.

Among the silane compounds of the formula (II) used in the invention, the alkoxy type compound containing no halogen includes tetrakis(2-ethylhexyloxy) silane, tetraphenoxy silane, methyltris(2-ethylhexyloxy) silane, ethyltris(2-ethylhexyloxy) silane, ethyltrisphenoxy silane, vinyltris(2-ethylhexyloxy) silane, ethyltriphenoxy silane, vinyltris(2-ethylhexyloxy) silane, vinyltriphenoxy silane, methylvinylbis(2-ethylhexyloxy) silane, ethylvinylbiphenoxy silane, monomethyltriphenoxy silane, dimethyldiphenoxy silane, monoethyltriphenoxy silane, diethyldiphenoxy silane, phenyltriphenoxy silane, diphenyldiphenoxy silane and the like. The aryl type compound containing no halogen includes tetraphenoxy silane, ethyltriphenoxy silane, vinyltriphenoxy silane, dimethyldiphenoxy silane, monoethyltriphenoxy silane, diethyldiphenoxy silane, phenyltriphenoxy silane, diphenyldiphenoxy silane and the like. The compound containing a halogen and having a non-hydrolytic OR group with a carbon number of 4 includes tri-t-butoxymonochloro silane, dichloro-di-t-butoxy silane, di-t-butoxy-diiodo silane, and the like, and the compound containing a halogen and having a non-hydrolytic OR group with a carbon number of 5 includes triphenoxymonochloro silane, monochloromethyldiphenoxy silane, monochloromethylbis(2-ethylhexyloxy) silane, monobromoethyldiphenoxy silane, monobromovinyldiphenoxy silane, monobromoisopropenylbis(2-ethylhexyloxy) silane, ditolyloxydichloro silane, diphenoxydiiodo silane, methyltris(2-methylbutoxy) silane, vinyltris(2-methylbutoxy) silane, monochloromethylbis(2-methylbutoxy) silane, vinyltris(3-methylbutoxy) silane, tetrakis(2-ethylhexyloxy) silane, tetraphenoxy silane, methyltris(2-ethylhexyloxy) silane, ethyltris(2-ethylhexyloxy) silane, ethyltriphenoxy silane, vinyltris(2-ethylhexyloxy) silane, vinyltriophenoxy silane, methylvinylbis(2-ethylhexyloxy) silane, ethylvinyldiphenoxy silane and the like. The halogen-containing aryloxy type compound includes triphenoxymonochloro silane, monochloromethyldiphenoxy silane, monobromoethyldiphenoxy silane, monobromovinyldiphenoxy silane, ditolyldichloro silane, diphenoxydiiodo silane and the like.

Among these silane compounds, silane compounds in which i is 0 or 1, particularly tetraphenoxy silane and monomethyltriphenoxy silane are preferable. These silane compounds may be used alone or in admixture.

The silane-modified polymer according to the invention is obtained by reacting the active terminal of the above living polymer with the silane compound of the formula (II). In this case, the amount of the silane compound used is not less than 0.7 molecule per one active terminal of the living polymer, preferably 0.7–5.0, more particularly 0.7–2.0. When the amount of the silane compound used is less than 0.7 molecule per one active terminal of the living polymer, the production of branched polymer becomes larger and the change of the molecular weight distribution is large and hence the control of the molecular weight and the molecular weight distribution is difficult, while when it exceeds 5.0 molecule per one active terminal of the living polymer, the effect of improving the wear resistance and fracture properties is saturated and it becomes unfavorable in view of economical reasons.

In the production of the silane-modified polymer, two-stage addition may be used wherein a small amount of the silane compound is first added to the active terminal of the living polymer to form a polymer having a branched structure and then another silane compound is added to the remaining active terminal.

The reaction between the active terminal of the living polymer and the functional group of the silane compound is carried out by adding the silane compound to the solution in the living polymer system, or by adding the solution of the living polymer to an organic solvent solution containing the silane compound.

The reaction temperature is $-120°$ C. to $+150°$ C., preferably $-80°$ C. to $+120°$ C. and the reaction time is 1 minute to 5 hours, preferably 5 minutes to 2 hours.

After the completion of the reaction, the silane-modified polymer can be obtained by blowing steam into the polymer solution to remove the solvent or adding a poor solvent such as methanol or the like to solidify the resulting silane-modified polymer and then drying through hot rolls or under a reduced pressure. Alternatively, the solvent may directly be removed from the polymer solution under a reduced pressure to obtain a silane-modified polymer.

Although the molecular weight of the silane-modified polymer can be varied over a wide range, the Mooney viscosity (ML1+4, 100° C.) is preferable to be within a range of 10–150. When the Mooney viscosity is less than 10, the wear resistance is poor, while when it exceeds 150, the processability is poor.

Moreover, the structure of the silane-modified polymer used in the invention can be confirmed, for example, by an infrared absorption spectrum that Si—O—C bond is assigned to about 1100 $cm^{-1}$, Si—O—$\phi$ bond is assigned to about 1250 $cm^{-1}$ and Si—C bond is assigned to about 1160 $cm^{-1}$.

The polymer or silane-modified polymer used in the invention is necessary to have a glass transition temperature (Tg) of not lower than $-50°$ C., preferably not lower than $-40°$ C. When Tg is lower than $-50°$ C., the wet-skid resistance is poor.

In the styrene-butadiene copolymer according to the invention, the content of bound styrene is preferable to be 15–50% by weight. Furthermore, it is favorable that the styrene single chain in the arrangement of bound styrene units is less than 40% by weight of total bound styrene and the styrene long chain consisting 8 or more styrene units is not more than 10% by weight of the total bound styrene. The styrene chain distribution according to the invention is determined by decomposing the polymer sample through ozone and analyzing through gel permeation chromatography (Tanaka et al., Kabunshi Gakkai Yokoshu, 29, (9), page 2055).

According to the invention, the polymer or the silane-modified polymer can be used alone as a rubber ingredient. If necessary, it may be used as a rubber blend with not more than 70 parts by weight, preferably not more than 50 parts by weight of at least one other diene series rubber such as natural rubber, cis-1,4-polyisoprene, emulsion-polymerized styrene-butadiene copolymer, solution-polymerized styrene-butadiene copolymer, low cis-1,4-polybutadiene, high cis-1,4-polybutadiene, ethylene-propylene-diene terpolymer, chloroprene, halogenated butyl rubber and butadiene-acrylonitrile copolymer rubber based on 100 parts by weight of total rubber ingredient. When the silane-modified polymer is used as a rubber blend, the amount of the silane-modified polymer used is preferably not less than 10% by weight, preferably not less than 20% by weight per the total rubber ingredient. When the amount is less than 10% by weight, the improving effect against silica is not recognized.

In the rubber composition according to the invention, the amount of the silica filler to be compounded is 10–150 parts by weight, preferably 15–100 parts by weight based on 100 parts by weight of total rubber ingredient. When the amount is less than 10 parts by weight, the reinforcing effect is small and the wear resistance is poor, while when it exceeds 150 parts by weight, the processability and the fracture properties are poor.

Moreover, 0–100 parts by weight of carbon black may be used together with the silica filler as a filler, whereby the processability, wear resistance and cut resistance can further be improved as compared with the use of the silica filler alone. In this case, the weight ratio of carbon black to silica filler is within a range of 95/5–10/90 from a viewpoint of the balance of wet-skid resistance, rolling resistance and wear resistance.

As the silane coupling agent used in the invention and represented by the formula (I), mention may be made of bis(3-triethoxysilylpropyl) tetrasulfide, bis(2-triethoxysilylethyl) tetrasulfide, bis(3-trimethoxysilylpropyl) tetrasulfide, bis(2-trimethoxysilylethyl) tetrasulfide, 3-mercaptopropyl trimethoxysilane, 3-mercaptopropyl triethoxysilane, 2-mercaptoethyl trimethoxysilane, 2-mercaptoethyl triethoxysilane, 3-nitropropyl trimethoxysilane, 3-nitropropyltriethoxysilane, 3-chloropropyltrimethoxysilane, 3-chloropropyl triethoxysilane, 2-chloroethyl trimethoxysilane, 2-chloroethyl triethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropyl benzothiazole tetrasulfide, 3-triethoxysilylpropyl benzothiazole tetrasulfide, 3-triethoxysilylpropyl methacrylate monosulfide, 3-trimethoxysilylpropyl methacrylate monosulfide and the like. Among them, bis(3-triethoxysilylpropyl) tetrasulfide, 3-trimethoxysilylpropyl benzothiazole tetrasulfide and the like are preferable. As the compound of the formula (I) in which three Ys are different, mention may be made of bis(3-diethoxymethylsilylpropyl) tetrasulfide, 3-mercaptopropyl dimethoxymethylsilane, 3-nitropropyl dimethoxymethylsilane, 3-chloropropyl dimethoxymethylsilane, dimethoxymethylsilylpropyl-N,N-dimethylthiocarbamoyl tetrasulfide, dimethoxymethylsilylpropyl benzothiazole tetrasulfide and the like.

The amount of the silane coupling agent added is varied in accordance with the amount of silica filler added, but is is 0.2–10 parts by weight, preferably 0.5–5 parts by weight. When the amount of the silane coupling agent is less than 0.2 part by weight, the coupling effect is very small and the effect of improving the rolling resistance and wear resistance is not observed, while when it exceeds 10 parts by weight, the reinforcing effect lowers and the wear resistance and cut resistance are degraded.

Moreover, the rubber composition according to the invention may be further compounded with a powdery filler such as magnesium carbonate, calcium carbonate, clay or the like, a fibrous filler such as glass fiber, whisker or the like, zinc white, an antioxidant, a vulcanization accelerator, a vulcanizing agent and so on, if necessary.

The following examples are given in illustration of the invention and are not intended as limitations thereof.

In these examples, the measurements were made by the following methods, respectively.

The Mooney viscosity was measured at a temperature of 100° C. after the preheating for 1 minute and the heating for 4 minutes.

The microstructure in butadiene portion was measured by an infrared absorption spectrometry (Molero's method).

The content of bound styrene was measured by using a calibration curve of phenyl group of 699 cm$^{-1}$ previously determined through an infrared absorption spectrometry.

The properties of vulcanizate were measured according to a method of JIS K6301.

A Lambourn abrasion index was measured by a Lambourn abrasion testing method. The measuring conditions were a load of 4.5 kg, a surface speed of grindstone of 100 m/sec, a speed of sample of 130 m/sec, a slipping rate of 305, a falling rate of stone of 20 g/min and room temperature.

The internal loss (tan δ) was measured by means of a mechanical spectrometer made by Rheometrix Inc. at various temperatures under dynamic shearing strain having an amplitude of 1.0% and a frequency of 15 Hz.

The rolling resistance index was measured by rotating the tire on a drum of 1.7 m in outer diameter to raise the rotating speed up to a given value, stopping the rotation to move the drum by inertia force and evaluating according to the following equation from a calculated value based on inertia moment (the larger the value, the smaller the rolling resistance).

inertia moment of control tire/inertia moment of test tire × 100

The skid resistance on wet road surface (wet-skid resistance) was evaluated according to the following equation from a running distance after the the vehicle was subjected to a rapid braking at a speed of 80 km/hr on a wet concrete road surface having a water depth of 3 mm (the larger the value, the better the wet-skid resistance).

running distance of control tire/running distance of test tire × 100

The wear resistance index was evaluated according to the following equation from average value when the remaining groove depth was measured at 10 positions after the tire was actually run over a distance of 40000 km (the larger the value, the better the wear resistance).

remaining groove depth of test tire/remaining groove depth of control tire × 100

The steering stability was evaluated according to a method of ASTM F516-77.

The production of the copolymer to be used in the tread of the test tire will be described below.

PRODUCTION EXAMPLE 1

Into a reaction vessel of 50 l capacity 25 kg of cyclohexane, 1.4 kg of styrene, 4.5 kg of 1,3-butadiene, 2.6 g of n-butyllithium, 0.5 g of sodium dodecylbenzene sulfonate and 1.8 g of ethylene glycol dimethyl ether were charged, which was polymerized in a nitrogen atmosphere at a polymerization temperature of 45° C. for 1.5 hours. After the remaining initiator was removed, the resulting polymer was dried to obtain a styrene-butadiene copolymer (copolymer No. 4 in Table 1).

Various copolymers shown in Table 1 were obtained by varying the charging ratio of styrene the polymerization temperature, the amount of sodium dodecylbenzene sulfonate and the like.

TABLE 1

| Copolymer No. | 1 | 2 | 3 | 4 | 5 | 6 | 7 | 8 |
|---|---|---|---|---|---|---|---|---|
| Content of bound styrene (wt %) | 5 | 25 | 10 | 25 | 40 | 40 | 41 | 55 |
| Content of 1,2-bond (wt %) | 65 | 15 | 72 | 50 | 22 | 21 | 23 | 20 |
| Styrene single chain of styrene unit (wt %) | 85 | 37 | 77 | 68 | 49 | 33 | 36 | 34 |
| Styrene long chain f 8 or more styrene units (wt %) | 0 | 2 | 1 | 1 | 6 | 2 | 15 | 5 |
| Glass transition temperature (°C.) | −58 | −59 | −48 | −38 | −39 | −35 | −36 | −14 |
| $ML_{1+4}$ (100° C.) | 48 | 151 | 50 | 51 | 49 | 50 | 51 | 48 |

EXAMPLES 1–10, COMPARATIVE EXAMPLES 1–6

In Table 2 are shown silane coupling agents used in these examples.

TABLE 2

| Compound name | | Structural formula |
|---|---|---|
| Silane coupling agent-1 | bis(3-triethoxysilyl-propyl) tetrasulfide | $[(C_2H_5O)_3SiC_3H_6]_2S_4$ |
| Silane coupling agent-2 | trimethoxysilyl-propyl-benzothiazole tetrasulfide | $(CH_3O)_3\text{—}SiC_3H_6S_4\text{—benzothiazole}$ |

Rubber compositions were prepared by using the copolymer of Table 1 and the silane coupling agent of Table 2 according to a compounding recipe shown in Table 3 (parts by weight). In Table 3, the amount of each of the copolymers used was 100 parts by weight. In these rubber compositions, compounding chemicals other than copolymer, filler and silane coupling agent were the same in Examples 1–10 and Comparative Examples 1–6 and were shown by "note" in Table 3. With respect to these rubber compositions, the fracture strength (Tb), Lambourn abrasion index and tan δ were measured to obtain results as shown in Table 3. Then, each of these rubber compositions was used to form a tread of a tire having a tire size of 165 SR 13, and thereafter the wet-skid resistance, rolling resistance and wear resistance were measured to obtain results as shown in Table 3.

TABLE 3

| | Comparative Example 1 | Comparative Example 2 | Comparative Example 3 | Example 1 | Example 2 | Example 3 | Example 4 | Example 5 |
|---|---|---|---|---|---|---|---|---|
| Copolymer No. | 4 | 1 | 2 | 3 | 4 | 5 | 6 | 7 |
| Carbon black HAF | 50 | 10 | 10 | 10 | 10 | 10 | 10 | 10 |
| Nipsil VN3 | — | 40 | 40 | 40 | 40 | 40 | 40 | 40 |
| Silane coupling agent-1 | — | 3.0 | 0.3 | 3.0 | 3.0 | 3.0 | 3.0 | 3.0 |
| Silane coupling agent-2 | — | — | — | — | — | — | — | — |
| Fracture strength (kg/cm²) | 242 | 221 | 235 | 241 | 251 | 253 | 257 | 255 |
| Lambourn abrasion index | 100 | 85 | 90 | 101 | 107 | 111 | 118 | 115 |
| tan δ (0° C.) | 0.343 | 0.285 | 0.271 | 0.321 | 0.353 | 0.361 | 0.363 | 0.346 |
| tan δ (60° C.) | 0.135 | 0.075 | 0.078 | 0.075 | 0.076 | 0.077 | 0.078 | 0.085 |
| Wet-skid resistance (index) | 100 | 91 | 90 | 101 | 105 | 104 | 105 | 104 |
| Rolling resistance (index) | 100 | 123 | 122 | 122 | 123 | 122 | 121 | 115 |
| Wear resistance (index) | 100 | 92 | 95 | 102 | 104 | 108 | 112 | 109 |

| | Example 6 | Example 7 | Example 8 | Example 9 | Example 10 | Comparative Example 4 | Comparative Example 5 | Comparative Example 6 |
|---|---|---|---|---|---|---|---|---|
| Copolymer No. | 8 | 4 | 6 | 4 | 6 | 4 | 4 | 4 |
| Carbon black HAF | 10 | 10 | 10 | 25 | 25 | 45 | 10 | 10 |
| Nipsil VN3 | 40 | 40 | 40 | 35 | 35 | 5 | 40 | 40 |
| Silane coupling agent-1 | 3.0 | — | — | 1.0 | 1.0 | 3.0 | 0.1 | 12.0 |
| Silane coupling agent-2 | — | 3.0 | 3.0 | — | — | — | — | — |
| Fracture strength (kg/cm²) | 252 | 249 | 257 | 250 | 255 | 239 | 198 | 178 |
| Lambourn abrasion index | 113 | 106 | 117 | 105 | 109 | 97 | 79 | 72 |
| tan δ (0° C.) | 0.521 | 0.361 | 0.351 | 0.342 | 0.353 | 0.331 | 0.362 | 0.310 |
| tan δ (60° C.) | 0.090 | 0.076 | 0.077 | 0.079 | 0.080 | 0.127 | 0.131 | 0.081 |
| Wet-skid resistance (index) | 107 | 105 | 104 | 103 | 104 | 99 | 104 | 97 |
| Rolling resistance (index) | 110 | 121 | 122 | 120 | 120 | 101 | 101 | 115 |
| Wear resistance (index) | 107 | 103 | 111 | 106 | 112 | 99 | 78 | 77 |

Note)
Compounding chemicals other than copolymer, filler and silane coupling agent (parts by weight):
aromatic oil 10, stearic acid 2, N-phenyl-N'-isopropyl-p-phenylene diamine 1, zinc white 3, N-oxydiethylene-2-benzothiazole sulfenamide 0.6, di-2-benzothiazylsulfide 0.8, sulfur 1.5.

As seen from Table 3, the pneumatic tires according to the invention are excellent in all of the wet-skid resistance, rolling resistance and wear resistance.

EXAMPLES 11–14, COMPARATIVE EXAMPLES 7–9

Rubber compositions were prepared according to a compounding recipe shown in Table 4. Then, the same tests as in Example 1 were made with respect to these rubber compositions as well as pneumatic tires made therefrom to obtain results as shown in Table 4.

TABLE 4

|  | Comparative Example 7 | Comparative Example 8 | Comparative Example 9 | Example 11 | Example 12 | Example 13 | Example 14 |
|---|---|---|---|---|---|---|---|
| Natural rubber | — | 80 | 80 | 70 | 70 | 30 | 30 |
| Copolymer No.4 | 100 | 20 | 20 | 30 | — | 70 | — |
| Copolymer No.6 | — | — | — | — | 30 | — | 70 |
| Carbon black HAF | 50 | 10 | 10 | 10 | 10 | 10 | 10 |
| Nipsil VN$_3$ | — | 40 | 40 | 40 | 40 | 40 | 40 |
| Silane coupling agent-1 | — | 3.0 | 3.0 | 3.0 | 3.0 | 3.0 | 3.0 |
| Aromatic oil | 10 | 10 | 10 | 10 | 10 | 10 | 10 |
| Stearic acid | 2.0 | 2.0 | 2.0 | 2.0 | 2.0 | 2.0 | 2.0 |
| Zinc white | 3.0 | 3.0 | 3.0 | 3.0 | 3.0 | 3.0 | 3.0 |
| N-oxydiethylene-2-benzothiazole sulfeneamide | 0.6 | 0.6 | 0.6 | 0.6 | 0.6 | 0.6 | 0.6 |
| di-2-benzothiazyl sulfide (DM) | 0.8 | 0.8 | 0.8 | 0.8 | 0.8 | 0.8 | 0.8 |
| N-phenyl-N'-isopropyl-p-phenylene diamine | 1.0 | 1.0 | 1.0 | 1.0 | 1.0 | 1.0 | 1.0 |
| Sulfur | 1.5 | 1.5 | 1.5 | 1.5 | 1.5 | 1.5 | 1.5 |
| Fracture strength (kg/cm$^2$) | 242 | 256 | 258 | 255 | 252 | 251 | 254 |
| Lambourn abrasion index | 100 | 94 | 98 | 103 | 102 | 104 | 108 |
| tan δ (0° C.) | 0.343 | 0.279 | 0.280 | 0.320 | 0.317 | 0.347 | 0.350 |
| tan δ (60° C.) | 0.135 | 0.075 | 0.074 | 0.076 | 0.075 | 0.077 | 0.078 |
| Wet-skid resistance (index) | 100 | 89 | 89 | 101 | 102 | 102 | 105 |
| Rolling resistance (index) | 100 | 124 | 125 | 121 | 123 | 122 | 121 |
| Wear resistance (index) | 100 | 96 | 99 | 101 | 103 | 105 | 108 |

PRODUCTION EXAMPLES 2

An autoclave of 5 l capacity provided with a stirrer and a jacket was dried and purged with nitrogen. Into this autoclave were charged 2500 g of cyclohexane, 100 g of styrene, 400 g of 1,3-butadiene and 25 g of tetrahydrofuran. After the temperature inside the autoclave was rendered into 10° C., the flow of cooling water was stopped and 0.300 g of n-butyllithium was added with stirring at 2 rpm to conduct polymerization for 30 minutes. A part of the resulting polymer solution was taken out and then the Mooney viscosity thereof was measured to be not more than 14.

Thereafter, the remaining polymer solution was added with 9.38 m of a solution of monomethyltriphenoxy silane in cyclohexane (concentration: 0.50 mol/l, mol ratio of monomethyltriphenoxy silane to n-butyllithium of 1.0), whereby the yellowish red of the living anion disappeared and the viscosity of the solution was raised. The reaction was further continued at 50° C. for 30 minutes.

Then, 0.7 g of 2,6-di-t-butyl phenol (BHT) was added to 100 g of the resulting polymer, which was subjected to steaming to remove the solvent and dried through hot rolls of 100° C. The yield of the polymer (copolymer No. 9) was substantially quantitative.

The copolymer Nos. 10–14 were prepared by the same method as described above except that various modifying agents shown in Table 5 were used instead of monomethyltriphenoxy silane. The copolymer No. 15 was prepared by the same method as in the copolymer No. 9 except that the modifying agent was not used.

In Table 5 are shown the content of bound styrene, vinyl content in butadiene portion, glass transition temperature and Mooney viscosity of the resulting copolymers.

TABLE 5

| | Copolymer No. | | | | | | |
|---|---|---|---|---|---|---|---|
| | 9 | 10 | 11 | 12 | 13 | 14 | 15 |
| ST (wt %) *1 | 25 | 25 | 25 | 25 | 25 | 5 | 25 |
| Vi (%) *2 | 50 | 50 | 50 | 50 | 50 | 60 | 50 |
| Coupling agent | monomethyltriphenoxy silane | tetraphenoxy silane | dichlorodiphenoxy silane | monochlorotriethoxy silane | monochloromethyldiphenoxy silane | tetraphenoxy silane | not used |
| ML$_{1+4}$, 100° C. | 50 | 51 | 48 | 48 | 51 | 51 | 50 |
| Tg (°C.) *3 | −38 | −37 | −38 | −38 | −36 | −58 | −39 |

*1: content of bound styrene
*2: vinyl content in butadiene portion
*3: glass transition temperature

EXAMPLES 16–24, COMPARATIVE EXAMPLES 10–16

In these examples were used the same silane coupling agents as shown in Table 2.

Rubber compositions were prepared by using the copolymer of Table 5 and the silane coupling agent according to a compounding recipe shown in Table 6 (parts by weight). In these rubber compositions, compounding chemicals other than copolymer, filler and silane coupling agent were the same in Examples 16–24 and Comparative Examples 10–16 and were shown by "note" in Table 6. With respect to these rubber compositions, the fracture strength (Tb), Lambourn abrasion index and tan δ were measured to obtain results as shown in Table 6. Then, each of these rubber compositions was used to form a tread of a tire having a tire size of 165 SR 13, and thereafter the wet-skid resistance, rolling resistance and wear resistance were measured to obtain results as shown in Table 6.

TABLE 6

| | Comparative | | Comparative | Comparative |

TABLE 6-continued

|  | Example 10 | Example 16 | Example 17 | Example 18 | Example 19 | Example 20 | Example 11 | Example 12 |
|---|---|---|---|---|---|---|---|---|
| Copolymer No. 9 |  | 80 |  |  |  |  |  |  |
| Copolymer No. 10 |  |  | 80 |  |  |  |  |  |
| Copolymer No. 11 |  |  |  | 80 |  |  |  |  |
| Copolymer No. 12 |  |  |  |  | 80 |  |  |  |
| Copolymer No. 13 |  |  |  |  |  | 80 |  |  |
| Copolymer No. 14 |  |  |  |  |  |  | 80 |  |
| Copolymer No. 15 |  |  |  |  |  |  |  | 80 |
| NR | 20 | 20 | 20 | 20 | 20 | 20 | 20 | 20 |
| Carbon black HAF | 50 | 10 | 10 | 10 | 10 | 10 | 10 | 10 |
| Silica filler VN$_3$ | 0 | 40 | 40 | 40 | 40 | 40 | 40 | 40 |
| Silane coupling agent-1 | none | 3 | 3 | 3 | 3 | 3 | 3 | 3 |
| Silane coupling agent-2 | none |  |  |  |  |  |  |  |
| Fracture strength (kg/cm$^2$) | 252 | 275 | 276 | 269 | 253 | 252 | 249 | 248 |
| Lambourn abrasion index | 100 | 117 | 119 | 115 | 105 | 103 | 88 | 80 |
| tan δ (0° C.) | 0.324 | 0.331 | 0.332 | 0.330 | 0.328 | 0.325 | 0.265 | 0.33 |
| tan δ (60° C.) | 0.126 | 0.070 | 0.071 | 0.073 | 0.080 | 0.076 | 0.072 | 0.081 |
| Wet-skid resistance (index) | 100 | 110 | 109 | 108 | 106 | 108 | 85 | 101 |
| Rolling resistance (index) | 100 | 131 | 132 | 129 | 115 | 123 | 130 | 115 |
| Wear resistance (index) | 100 | 115 | 117 | 112 | 105 | 105 | 95 | 85 |

|  | Example 21 | Example 22 | Example 23 | Example 24 | Comparative Example 13 | Comparative Example 14 | Comparative Example 15 | Comparative Example 16 |
|---|---|---|---|---|---|---|---|---|
| Copolymer No. 9 | 80 |  | 80 |  | 80 | 5 | 80 | 80 |
| Copolymer No. 10 |  |  |  |  |  |  |  |  |
| Copolymer No. 11 |  |  |  |  |  |  |  |  |
| Copolymer No. 12 |  |  |  |  |  |  |  |  |
| Copolymer No. 13 |  | 80 |  | 80 |  |  |  |  |
| Copolymer No. 14 |  |  |  |  |  |  |  |  |
| Copolymer No. 15 |  |  |  |  |  | 75 |  |  |
| NR | 20 | 20 | 20 | 20 | 20 | 20 | 20 | 20 |
| Carbon black HAF | 10 | 10 | 25 | 25 | 10 | 10 | 45 | 10 |
| Silica filler VN$_3$ | 40 | 40 | 35 | 35 | 40 | 40 | 5 | 40 |
| Silane coupling agent-1 |  |  | 1.0 | 1.0 | 0.1 | 3.0 | 3.0 | 12.0 |
| Silane coupling agent-2 | 3 | 3 |  |  |  |  |  |  |
| Fracture strength (kg/cm$^2$) | 269 | 265 | 280 | 281 | 249 | 253 | 254 | 166 |
| Lambourn abrasion index | 121 | 119 | 119 | 117 | 90 | 72 | 99 | 55 |
| tan δ (0° C.) | 0.332 | 0.330 | 0.325 | 0.330 | 0.325 | 0.321 | 0.325 | 0.310 |
| tan δ (60° C.) | 0.073 | 0.074 | 0.075 | 0.076 | 0.085 | 0.085 | 0.121 | 0.121 |
| Wet-skid resistance (index) | 109 | 108 | 106 | 105 | 108 | 107 | 98 | 101 |
| Rolling resistance (index) | 129 | 128 | 129 | 128 | 111 | 116 | 99 | 99 |
| Wear resistance (index) | 113 | 111 | 116 | 115 | 94 | 86 | 99 | 65 |

As mentioned above, in the pneumatic tires according to the invention, the rubber composition comprising polybutadiene or butadiene-styrene copolymer or silane-modified polymer having a glass transition temperature of not lower than −50° C., silica filler and silane coupling agent within particular compounding ratio range is used as a tread rubber, so that the wet-skid resistance, rolling resistance and wear resistance are simultaneously satisfied.

What is claimed is:

1. A pneumatic tire comprising a tread made from a rubber composition comprising 10–150 parts by weight of a silica filler, 0–150 parts by weight of carbon black and 0.2–10 parts by weight of at least one silane coupling agent represented by the following general formula:

$$Y_3-Si-C_nH_{2n}A \qquad (I)$$

wherein Y is an alkyl group or alkoxyl group having a carbon number of 1–4 or a chlorine atom, provided that the three Ys are the same or different, n is an integer of 1–6, and A is —S$_m$C$_n$H$_{2n}$Si—Y$_3$ group, —X group or S$_m$Z group (in which X is a nitroso group, a mercapto group, an amino group, an epoxy group, a vinyl group, an imido group or a chlorine atom, Z is

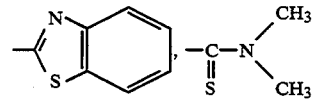

or

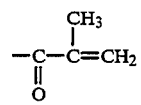

group, each of m and n is an integer of 1–6 and Y is the same as defined above)), based on 100 parts by weight of a polymer or copolymer rubber or a rubber blend of not less than 30 parts by weight of the above polymer or copolymer and not more than 70 parts by weight of another diene series rubber, wherein said polymer or copolymer is a silane-modified polymer having a glass transition temperature of not lower than −50° C. and obtained by reacting an active terminal of a resulting living polymer through polymerization of 1,3-butadiene or copolymerization of 1,3-butadiene and styrene in an inert organic solvent, in the presence of an organic alkali metal initiator, with a silane compound represented by the following general formula:

$$U_j Si(OR)_i R'_{4-i-j} \qquad (II)$$

(wherein U is a halogen atom selected from chlorine, bromine and iodine, each of R and R' is an alkyl group, an aryl group, a vinyl group or a halogenated alkyl group each having a carbon number of 1–20, j is an integer of 1–4, i is an integer of 0–2 and a sum of i and j is 2–4).

2. The pneumatic tire according to claim 1, wherein said copolymer has a content of bound styrene of 15–50% by weight.

3. The pneumatic tire according to claim 2, wherein the amount of single chain styrene introduced into the copolymer is less than 40% by weight of the total bound styrene content and the amount of long chain styrene which has 8 or more styrene units is not less than 10% by weight of the total bound styrene content.

4. The pneumatic tire according to claim 1, wherein said rubber composition contains 15–100 parts by weight of said silica filler and 0.5–5 parts by weight of said silane coupling agent.

5. The pneumatic tire according to claim 1, wherein said silane compound of formula (II) is selected from the group consisting of tetrakis(2-ethylhexyloxy) silane, tetraphenoxy silane, methyltris(2-ethylhexyloxy) silane, ethyltris(2-ethylhexyloxy) silane, ethyltrisphenoxy silane, vinyltris(2-ethylhexyloxy) silane, ethyltriphenoxy silane, vinyltris(2-ethylhexyloxy) silane, vinyltriphenoxy silane, methylvinylbis(2-ethylhexyloxy) silane, ethylvinylbiphenoxy silane, monomethyltriphenoxy silane, dimethyldiphenoxy silane, monoethyltriphenoxy silane, diethyldiphenoxy silane, phenyltriphenoxy silane, diphenyldiphenoxy silane, tetraphenoxy silane, ethyltriphenoxy silane, vinyltriphenoxy silane, dimethyldiphenoxy silane, monoethyltriphenoxy silane, diethyldiphenoxy silane, phenyltriphenoxy silane, diphenyldiphenoxy silane, tri-t-butoxymonochloro silane, dichloro-di-t-butoxy silane, di-t-butoxy-diiodo silane, triphenoxymonochloro silane, monochloromethyldiphenoxy silane, monochloromethylbis(2-ethylhexyloxy) silane, monobromoethyldiphenoxy silane, monobromovinyldiphenoxy silane, monobromoisopropenylbis(2-ethylhexyloxy) silane, ditolyloxydichloro silane, diphenoxydiiodo silane, methyltris(2-methylbutoxy) silane, vinyltris(2-methylbutoxy) silane, monochloromethylbis(2-methylbutoxy) silane, vinyltris(3-methylbutoxy) silane, tetrakis(2-ethylhexyloxy) silane, tetraphenoxy silane, methyltris(2-ethylhexyloxy) silane, ethyltris(2-ethylhexyloxy) silane, ethyltriphenoxy silane, vinyltris(2-ethylhexyloxy) silane, vinyltriphenoxy silane, methylvinylbis(2-ethylhexyloxy) silane, ethylvinyldiphenoxy silane, triphenoxymonochloro silane, monochloromethyldiphenoxy silane, monobromoethyldiphenoxy silane, monobromovinyldiphenoxy silane, ditolyldichloro silane and diphenoxydiiodo silane.

* * * * *